United States Patent
Gjini et al.

(10) Patent No.: US 7,622,888 B2
(45) Date of Patent: Nov. 24, 2009

(54) FUEL CELL-ELECTROLYZER SYSTEM CONTROLLED BY A SINGLE BI-DIRECTIONAL DC-TO-DC CONVERTER

(75) Inventors: Orges Gjini, Clifton Park, NY (US); Mark Dame, Niskayuna, NY (US); Michael Krok, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 441 days.

(21) Appl. No.: 11/301,662

(22) Filed: Dec. 13, 2005

(65) Prior Publication Data
US 2007/0132425 A1   Jun. 14, 2007

(51) Int. Cl.
H01M 10/44 (2006.01)
H01M 12/00 (2006.01)

(52) U.S. Cl. ............ 320/101; 320/138; 320/139; 136/291; 323/906

(58) Field of Classification Search ............ 320/101; 429/9
See application file for complete search history.

(56) References Cited

U.S. PATENT DOCUMENTS 5,291,283 A    3/1994 Kondo et al.

| 2003/0072977 A1* | 4/2003 | Speranza et al. | 429/9 |
| 2004/0018399 A1* | 1/2004 | Jung | 429/9 |
| 2005/0008904 A1* | 1/2005 | Suppes | 429/9 |

OTHER PUBLICATIONS

Chung, Henry S.H. et al., "Development of a Switched-Capacitor DC-DC Converter with Bidirectional Power Flow," 47 *IEEE Transactions on Circuits and Systems-I: Fund. Theory and Apps.* 1383 (2000).

* cited by examiner

*Primary Examiner*—Edward Tso
*Assistant Examiner*—Yalkew Fantu
(74) *Attorney, Agent, or Firm*—Scully, Scott, Murphy & Presser, P.C.

(57) ABSTRACT

A self-contained regenerative power system includes a fuel cell operative to generate electric energy from hydrogen and oxygen, generating water as a byproduct, and an electrolyzer operative to generate hydrogen and oxygen from water by consumption of electric energy. A bi-directional DC-to-DC converter interfaces between the fuel cell and the electrolyzer on one side and the system to be powered on the other. A switch selectively connects either the fuel cell or the electrolyzer with the bi-directional DC-to-DC converter. The products of the fuel cell process can be supplied to the electrolyzer process, and vice versa. Alternately, the self-contained regenerative power system comprises a unitary fuel cell and electrolyzer.

16 Claims, 2 Drawing Sheets

FUEL CELL-ELECTROLYZER SYSTEM CONTROLLED BY A SINGLE BI-DIRECTIONAL DC-TO-DC CONVERTER

BACKGROUND OF THE INVENTION

1. Field of Invention

The present invention relates to the field of alternative power sources, and more particularly to a power control device and method in a closed-loop renewable hydrogen energy system.

2. Description of Related Art

A closed-loop renewable hydrogen energy system is generally comprised of two core components. A fuel cell combines constituent hydrogen and oxygen to produce water ($H_2O$) and generates electricity from the energy released by the reaction. On the other hand, an electrolyzer consumes electrical energy to and stores it as chemical energy by dividing water into its constituent elements, hydrogen and oxygen. To complete the closed loop, the water produced by the fuel cell is the input material for the electrolyzer, and the hydrogen and oxygen produced by the electrolyzer are the input materials for the fuel cell.

According to the prior art, the electrolyzer and fuel cell are each separately interfaced with a DC bus via conventional DC-to-DC converter, in order to step-up/down the voltage between the operating voltage of the fuel cell and electrolyzer on one side, and the DC bus on the other. However, multiple DC-to-DC converters are redundant, add weight, cost and complexity to the system, and create an additional point of failure that could disable the system. Therefore, an improved arrangement would be desirable in the art.

BRIEF SUMMARY OF THE INVENTION

Therefore, according to a first embodiment of the present invention, provided is a self-contained regenerative power system comprising a fuel cell operative to generate electric energy from hydrogen and oxygen, generating water as a byproduct, and an electrolyzer operative to generate hydrogen and oxygen from water by consumption of electric energy. A bi-directional DC-to-DC converter interfaces between both the fuel cell and the electrolyzer on one side of the bi-directional converter and the system to be powered on the other side of the bi-directional converter. A switch selectively places one of the fuel cell and the electrolyzer in electric communication with the bi-directional DC-to-DC converter.

According to further embodiments, the self-contained regenerative power system includes storage for the hydrogen and oxygen generated by the electrolyzer, with the fuel cell being supplied with hydrogen and oxygen from the storage. Alternately or additionally, the self-contained regenerative power system according includes a container for holding water generated by the fuel cell, with the electrolyzer being supplied with water from the container.

According to a second embodiment of the present invention, a self-contained regenerative power system comprises a unitary fuel cell and electrolyzer, selectively operative to generate electric energy from constituent hydrogen and oxygen, generating water as a byproduct, or to generate hydrogen and oxygen from water by consumption of electric energy. A bi-directional DC-to-DC converter interfaces between both the unitary fuel cell and electrolyzer on one side of the bi-directional converter and the system to be powered on the other side of the bi-directional converter.

The self-contained regenerative power system according to the present invention may optionally include a DC bus in electric communication with the bi-directional DC-to-DC converter. It preferably includes a supplemental source of electric energy. The supplemental source of electric energy may be intermittent, and according to one embodiment, the supplemental source of electric energy comprises solar generation.

BRIEF DESCRIPTION OF THE DRAWINGS

These and other features, advantages and benefits of the present invention will be made apparent with reference to the following specification and figures, wherein.

DETAILED DESCRIPTION OF THE INVENTION

Figure 1:
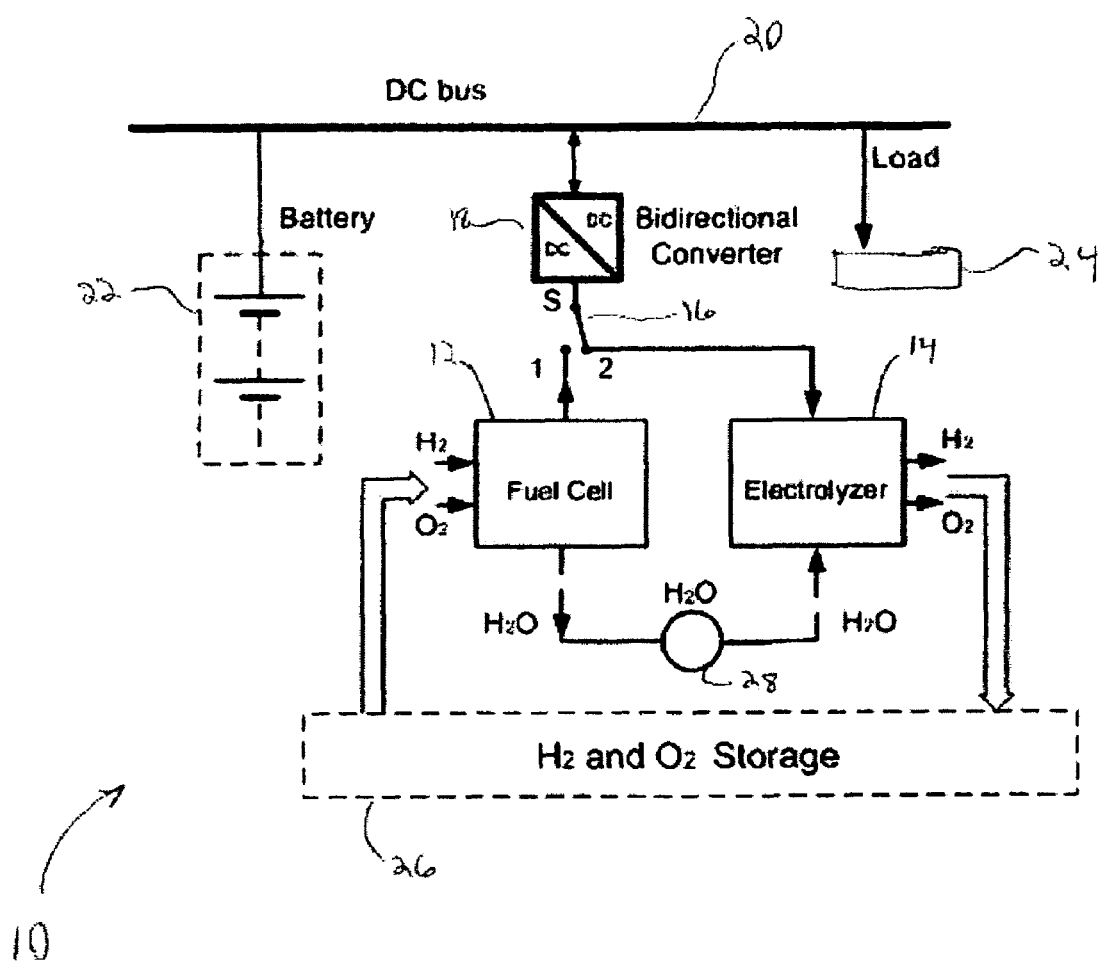
FIG. 1 illustrates a schematic representation of a closed-loop renewable hydrogen energy power system according to a first embodiment of the present invention, including separate fuel cell and electrolyzer components.

Referring now to FIG. 1, illustrated is a schematic representation of a closed-loop renewable hydrogen energy power system, generally 10, according to a first embodiment of the present invention. In this embodiment, the power system 10 includes a separate fuel cell 12 and electrolyzer 14. A switch 16, which may include mechanical and/or electronic (e.g., solid state, etc.) selective power direction capability, selectively communicates one of the fuel cell 12 and electrolyzer 14 with a bi-directional DC-to-DC converter 18. The bi-directional DC-to-DC converter 18 also communicates with a DC bus 20 of the unit to be powered by the power system 10. Also connected to the DC bus 20 is an alternate power supply 22, illustrated in this exemplary embodiment as a battery, though this is merely representative and could be any other source of supply. Additionally, a load 24 to be powered by the power system 10 is connected to the DC bus 20.

When the fuel cell 12 is to supply energy to the DC bus 20, switch 16 is placed in position 1, connecting the fuel cell 12 with the DC bus 20 through the bi-directional DC-to-DC converter 18. The fuel cell 12 combines hydrogen and oxygen from storage 26. Energy is released by the combination and supplied as electricity to the DC bus 20 via the bi-directional DC-to-DC converter 18. Water is produced as a byproduct of the energy generation, and is stored in container 28.

When the DC bus 20 is provided with excess energy, for example from the supply 22, beyond the needs of the load 24, it is beneficial to store that excess energy. Switch 16 is placed in position 2, connecting the electrolyzer 14 with the DC bus 20 through the bi-directional DC-to-DC converter 18. Electrolyzer 14 draws water from container 28, and separates the water into hydrogen and oxygen, which are directed to storage 26. In this manner, energy is stored as chemical energy, to be converted by the fuel cell 12 as needed.

Figure 2:
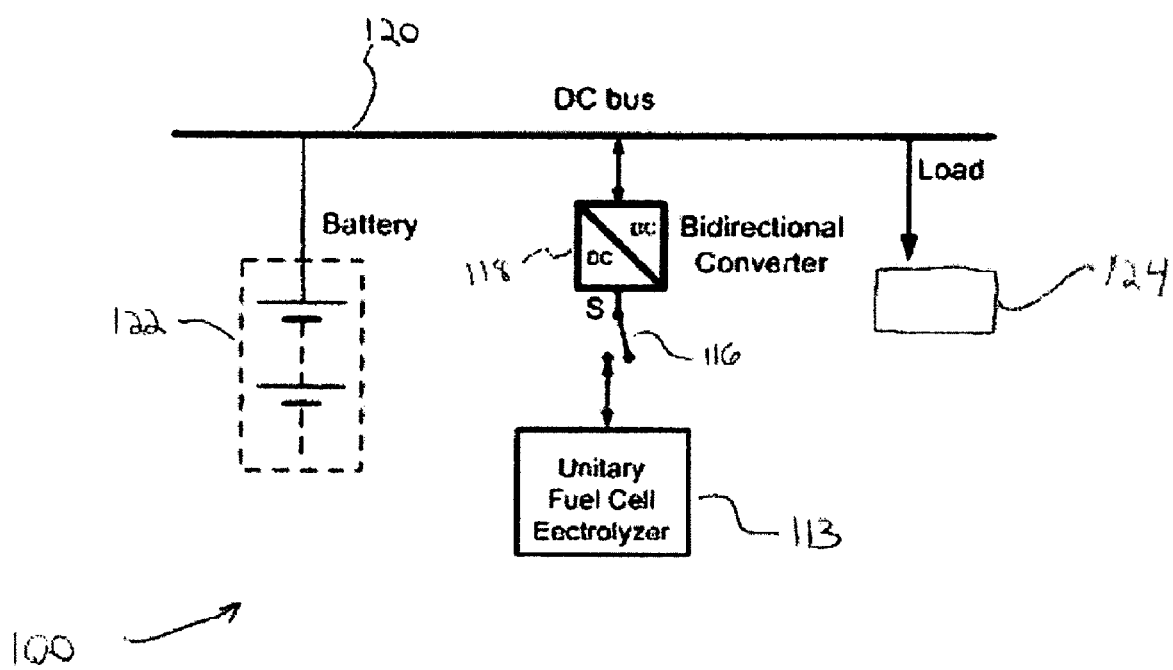
FIG. 2 illustrates a schematic representation of a closed-loop renewable hydrogen energy power system according to a second embodiment of the present invention, including a unitary fuel cell and electrolyzer.

Referring now to FIG. 2, illustrated is a schematic representation of a closed-loop renewable hydrogen energy power system, generally 100, according to a second embodiment of the present invention. Elements of the system 100 which are generally similar to the first embodiment will not be discussed in detail. In the second embodiment, similar to the first, DC bus 120 is common to a supply 122, a load 124, and a bi-directional DC-to-DC converter 118.

In place of the fuel cell 12 and electrolyzer 14 of the first embodiment, this second embodiment includes a unitary fuel cell electrolyzer 113. Unitary fuel cell electrolyzer 113 combines the functions of fuel cell 12 and electrolyzer 14 of the first embodiment. Hydrogen and oxygen storage 26 as well as water container 28 are internalized in the unitary fuel cell electrolyzer 113. The function of the unitary fuel cell electrolyzer 113, either storing or generating energy, is determined according to the voltage detected at the bus 120 through the bi-directional DC-to-DC converter 118.

In this second embodiment, switch 116 connects or disconnects the unitary fuel cell electrolyzer 113 from the bi-directional DC-to-DC converter 118. Alternately, the function of the switch may be internalized with the unitary fuel cell electrolyzer 113 or the bi-directional DC-to-DC converter 118, or it may be eliminated altogether.

The closed-loop hydrogen energy system described herein is particularly applicable, by way of example only, to a continuously operative system that has an intermittent energy source in excess of its operating needs. Consider a continuously operating outdoor system powered by solar energy, preferably a mobile system (e.g., aircraft, land vehicle, watercraft, spacecraft, etc.). During the hours of daylight, the system receives solar energy and converts that energy to electricity, represented as source 22, 122, in excess of its operating needs. The excess electric energy is stored as chemical energy by electrolyzer 14, 113. During the hours of darkness, fuel cell 12, 113 consumes the products of the electrolyzer to generate electric energy for operating the system, producing water as a byproduct. This water, in turn, is input to the electrolyzer during the next period of daylight, forming a regenerative closed-loop power system. Therefore, anything powered by such a system could possibly operate on a continuous basis almost indefinitely.

The present invention has been described with reference to certain exemplary embodiments. Certain alterations or modifications of the disclosed embodiments may be apparent to those skilled in the art in light of the present disclosure without departing from the scope of the present invention. These embodiments are offered as merely illustrative, and not limiting, of the scope of the claimed invention, which is defined solely with reference to the appended claims.

The invention claimed is:

1. A self-contained regenerative power system comprising:
a fuel cell operative to generate electric energy from hydrogen and oxygen, generating water as a byproduct;
an electrolyzer operative to generate hydrogen and oxygen from water by consumption of electric energy;
a bi-directional DC-to-DC converter for interfacing between both the fuel cell and the electrolyzer on one side of the bi-directional converter and the system to be powered on the other side of the bi-directional converter; and
a switch for selectively placing one of the fuel cell and the electrolyzer in electric communication with the bi-directional DC-to-DC converter.

2. The self-contained regenerative power system according to claim 1, further comprising storage for the hydrogen and oxygen generated by the electrolyzer.

3. The self-contained regenerative power system according to claim 2, wherein the fuel cell is supplied with hydrogen and oxygen from the storage.

4. The self-contained regenerative power system according to claim 1, further comprising a container for holding water generated by the fuel cell.

5. The self-contained regenerative power system according to claim 4, wherein the electrolyzer is supplied with water from the container.

6. The self-contained regenerative power system according to claim 1 further comprising a DC bus in electric communication with the bi-directional DC-to-DC converter.

7. The self-contained regenerative power system according to claim 1 further comprising a supplemental source of electric energy.

8. The self-contained regenerative power system according to claim 7 wherein the supplemental source of electric energy is intermittent.

9. The self-contained regenerative power system according to claim 7 wherein the supplemental source of electric energy comprises solar generation.

10. The self-contained regenerative power system according to claim 1, wherein the power system supplies a mobile vehicle.

11. A self-contained regenerative power system comprising:
a unitary fuel cell and electrolyzer, selectively operative to generate electric energy from constituent hydrogen and oxygen, generating water as a byproduct, or to generate hydrogen and oxygen from water by consumption of electric energy; and
a bi-directional DC-to-DC converter for interfacing between both the unitary fuel cell and electrolyzer on one side of the bi-directional converter and the system to be powered on the other side of the bi-directional converter.

12. The self-contained regenerative power system according to claim 11 further comprising a DC bus in electric communication with the bi-directional DC-to-DC converter.

13. The self-contained regenerative power system according to claim 11 further comprising a supplemental source of electric energy.

14. The self-contained regenerative power system according to claim 13 wherein the supplemental source of electric energy is intermittent.

15. The self-contained regenerative power system according to claim 13 wherein the supplemental source of electric energy comprises solar generation.

16. The self-contained regenerative power system according to claim 11, wherein the power system supplies a mobile vehicle.

* * * * *